Feb. 18, 1964  F. W. KRUSE, JR., ETAL  3,121,848
CONTINUOUSLY VARIABLE MICROSTRIP ATTENUATOR
USING DIRECTIONAL COUPLER
Filed May 17, 1962  3 Sheets-Sheet 1

INVENTORS
FREDERICK W. KRUSE, Jr.
BERNARD A. WAMBSGANSS
BY
ATTORNEY

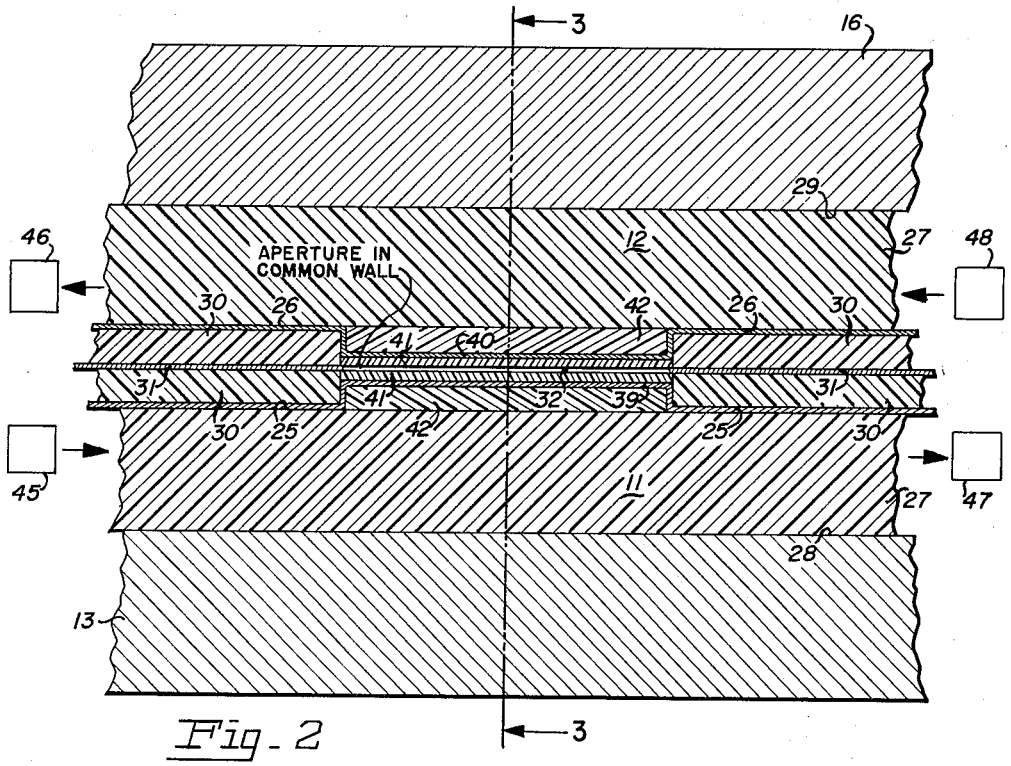
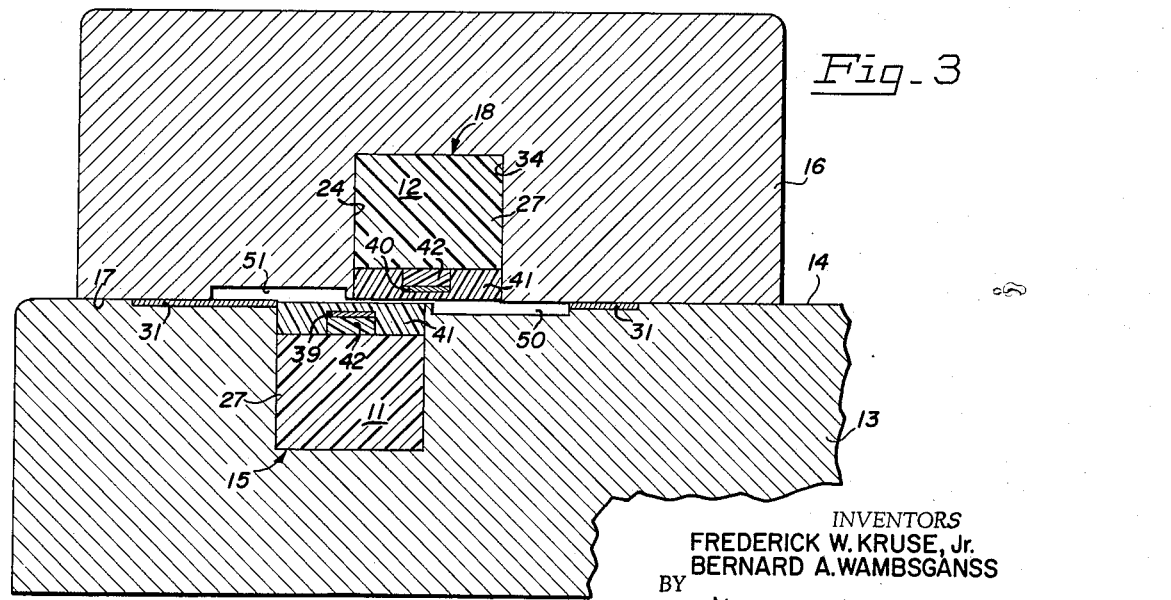

Feb. 18, 1964 F. W. KRUSE, JR., ETAL 3,121,848
CONTINUOUSLY VARIABLE MICROSTRIP ATTENUATOR
USING DIRECTIONAL COUPLER
Filed May 17, 1962 3 Sheets-Sheet 3

INVENTORS
FREDERICK W. KRUSE, Jr.
BERNARD A. WAMBSGANSS
BY
ATTORNEY

United States Patent Office 3,121,848
Patented Feb. 18, 1964

3,121,848
CONTINUOUSLY VARIABLE MICROSTRIP ATTENUATOR USING DIRECTIONAL COUPLER
Frederick W. Kruse, Jr., Palo Alto, and Bernard A. Wambsganss, Los Altos, Calif., assignors to Alfred Electronics, Palo Alto, Calif., a corporation of California
Filed May 17, 1962, Ser. No. 195,466
15 Claims. (Cl. 333—10)

This invention relates to high-frequency R-F signal translating devices and more particularly to a device for directionally coupling a selected, continuously variable, portion of the wave energy propagated in a first translation path to a second translation path.

It is frequently desirable to couple a selected amount of wave energy, continuously variable from below 3 db to above 100 db, from a first wave energy translation path to a second translation path and make the direction of propagation in the second path dependent on the direction of propagation in the first path. A device for performing such coupling combines the properties of an adjustable wave energy attenuator and a wave energy directional coupler.

For example, when coupling a high-frequency R-F signal generator, usually having a constant power output level or a power output level variable only between narrow limits, to a utilization device having a variety of different input power requirements or to a single utilization device having a continuously variable input power requirement, some translating device must be provided between the generator and the utilization device to vary the fraction of the generator power applied to the utilization device. The unwanted portion of the generator power may then be dissipated in matched dummy load.

For many applications it is desirable to utilize an attenuator capable of providing continuously variable attenuation over a large range of the generator output power so that a utilization device may be powered at any selected input power level.

Since any coupling between two transmission lines presents some sort of discontinuity, it is easily understood that a variable coupling may give rise to a varying discontinuity. A varying discontinuity in a waveguide transmission line results in a device having an impedance which varies with the degree of coupling. Such a discontinuity causes a large voltage standing wave ratio. Since the attenuator flatness with frequency deteriorates when the VSWR is high, it is of the utmost importance that the variable attenuator be constructed to maintain line impedance independent of attenuator setting.

When utilizing a continuously variable, non-dissipative attenuator for coupling wave energy transmitted in one transmission path to another transmission path, the energy not coupled into the second path must be dissipated by some means to avoid reflection. Since the amount of wave energy to be dissipated varies with the wave energy coupled to the utilization device, the dissipating means must be efficient over a large range of input power so that the reflection remains constant and at a minimum. Since a certain amount of reflected wave energy can never be entirely avoided but only minimized, and since these reflections are often a function of the frequency, it is desirable that a continuously variable, non-dissipative attenuator be sensitive to the direction of propagation of wave energy in the first translation path so that the reflected wave does not pass into the second translation path and travel in the same direction as the attenuated wave energy coupled into the second path. One of the most efficient means of preventing the reflected wave energy to be added to the coupled energy is to utilize a directional coupler type of coupling between the first and the second translating path.

It is therefore a primary object of this invention to provide a means for coupling a selected portion of wave energy from a first to a second wave energy translation path which means is continuously variable as to the amount of energy coupled.

It is another object of this invention to provide a continuously variable attenuator for high frequency R-F signals capable of attenuating over a range extending from below 3 db to above 80 db.

It is a further object of this invention to provide a continuously variable attenuator for high frequency R-F signals having a low insertion loss for maximum coupling, a low and substantially constant voltage standing wave ratio (VSWR), and a wide frequency bandwidth.

It is still another object of this invention to provide a continuously variable attenuator which is selective between wave energy signals traveling in opposite directions along the same path of propagation.

It is still a further object of this invention to provide an improved wave signal transmission system having two translation paths and including means for continuously varying the amount of wave energy coupled between the two translation paths. Further, the transmission system to be provided is to have a low and substantially frequency independent voltage standing wave ratio and insertion loss. The voltage standing wave ratio is also to be substantially independent of the degree of coupling between the two translation paths.

In accordance with a preferred embodiment of this invention, a continuously variable attenuator is provided by utilizing a pair of strip lines, each being formed of a three sided channel in a metallic plate. The strip in the strip line is closest to the open side. The two plates are mounted for lateral displacement with one another in such a manner that respective open sides face one another. A thin metal foil is sandwiched between the plates to form the fourth side of both strip lines which is therefore a common wall. The foil is stationary with respect to the lower plate.

The metal foil is provided with an aperture having a length substantially equal to one-quarter of the center of the operating frequency range and a width equal to twice the strip line width, one edge being contiguous with one of the side walls of the channel in the lower plate. The portion of the strips in the strip line coextensive with the aperture are spaced as close to one another as possible to provide good coupling when opposite channels are coextensive with one another.

Continuously variable attenuation is provided by laterally moving the upper plate over the foil in the direction of aperture extension. The degree of coupling is proportional to the width of the coextensive portion of the two strip lines across the aperture and is a minimum when the upper strip line is moved so that no coextensive portion remains.

Further, to avoid reflections as one strip line is laterally moved across the other, each strip line includes a lateral extension which provides a ground plane for the opposite strip line and since the strip is very close to the open side of the strip line at the aperture, the ground plane extension is cavitated for proper impedance matching. In addition, mode suppression means are provided to avoid generation of higher order modes.

Other objects and a better understanding of the invention may be had by reference to the following description, taken in conjunction with the accompanying drawings, in which:

FIG. 2 is an enlarged sectional view taken along lines 2—2 of FIG. 1;

FIG. 3 is an enlarged sectional view taken along line 3—3 of FIG. 2;

Figure 1:
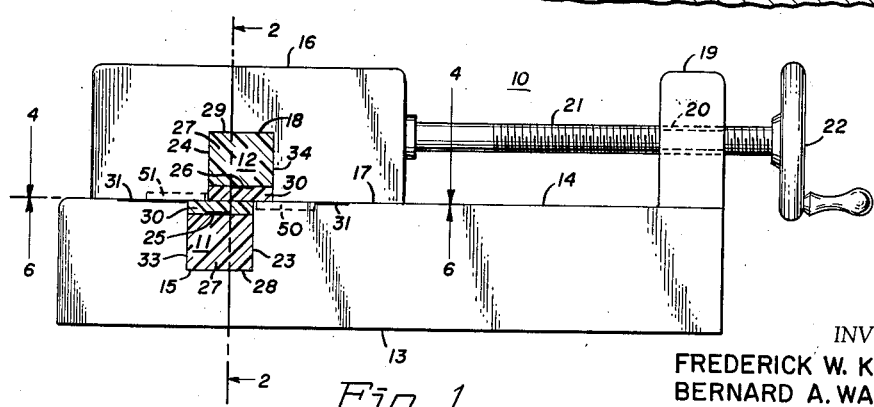
FIG. 1 is an elevational end view of the continuously variable attenuator of this invention.

Referring now to the drawings, in which like reference characters designate like parts, there is shown a continuously variable attenuator constructed in accordance with this invention and designated by reference character 10. As best seen in FIG. 1, attenuator 10 comprises a pair of wave energy transmission lines 11 and 12 respectively which are mounted for lateral sliding motion with respect to one another. Transmission lines 11 and 12 are shown to be of the form generally known as strip lines and are very useful in practicing the present invention because at least one of their outer walls are planar. It is to be understood, however, that the present invention may likewise be practiced with coaxial transmission lines in which the outer conductor is tubular, at least in part, and the inner conductor is a circular center conductor, and with hollow waveguides as will be understood readily by those skilled in the art.

More specifically, attenuator 10 comprises a base plate 13 having a planar surface portion 14 into which a substantially rectangular channel 15 is cut to form the outer conductor of transmission line 11. Slidingly mounted upon upper surface 14 of base plate 13 is an upper plate 16 having a lower surface 17 into which a substantially rectangular channel 18 is cut, substantially like channel 15, to form the outer conductor of transmisison line 12.

Base plate 13 is provided with a vertically extending bracket 19 having a threaded opening or passage 20. A threaded lead screw or spindle 21 having a hand wheel 22 mounted thereto, engages threaded opening 20 and is rotatably mounted to upper plate 16 so that rotation of hand wheel 22 laterally displaces upper plate 16 with respect to base plate 13. It is to be understood that bracket 19 and spindle 21 are merely illustrative of a lateral moving means and have been selected for simplicity in showing the operation of this invention. In practice, it will be found more convenient to utilize guides and worm gears so that accurately controllable and true lateral motion is provided. The limits of lateral displacement between transmission lines 11 and 12 will be explained in more detail hereinafter, and should include a first position in which transmission lines 11 and 12 are exactly opposite to one another and a second position in which transmission lines 11 and 12 are displaced with respect to one another so that side wall 23 is perpendicularly aligned with side wall 24.

Inner conductors for transmission lines 11 and 12 are in the form of strips 25 and 26 asymmetrically located respectively in channels 15 and 18. The means utilized for asymmetrically supporting strips 25 and 26 inside channels 15 and 18 will now be explained. Each channel, as best seen in FIG. 1, includes a substantially rectangular elongated insert 27 of low-loss dielectric material such as Teflon which completely fills the respective channel to a selected height, the selected height being the distance between strip 25 and bottom wall 28 of transmission line 11 and strip 26 and top wall 29 of transmission line 12. Strips 25 and 26 are placed on the respective upper and lower surface of insert 27. The remaining space of channels 15 and 18 is then filled with inserts 30 which are provided with a shallow accommodation channel dimensioned to clear strips 25 and 26. In this manner, strips 25 and 26 are respectively asymmetrically supported within channels 15 and 18.

Channels 15 and 18 and strips 25 and 26 are respectively dimensioned and relatively spaced to provide transmission lines having a selected impedance. For example, in order to provide a transmission line having an impedance of approximately 50 ohms the dimensions are as follows: the width of each channel is .275 inch, the depth of each channel is .250 inch, the width of each strip is .120 inch, and the thickness of each strip is .003 inch. The strip is positioned in such a manner that its distance of separation from the bottom of the channel is .200 inch (in case of strip 25 and wall 18) and symmetric with respect to the side walls.

Transmission lines 11 and 12 so far described are three sided strip lines (enclosed on three sides) open along one side and are disposed so that the open side of one faces the open side of the other. To provide the fourth wall, a thin metallic foil member 31 is sandwiched between surface 14 of base plate 13 and surface 17 of upper plate 16. Foil member 31, which forms a common waveguide wall, becomes the top wall of transmission line 11 and the bottom wall of transmission line 12 and is selected to be of very thin material so that the distance of separation between transmission lines 11 and 12 is kept at a minimum. Common wall 31 is immovably affixed either to base plate 13 so that upper plate 16 slides thereover (as shown) or may be affixed to upper plate 16 so that it, together with upper plate 16, may slide over base plate 13.

Figure 7:
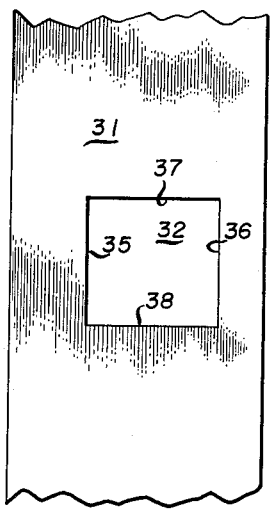
FIG. 7 is a top view of the conductive ground plane looking in the direction of line 4—4 of FIG. 1.

Common wall 31, shown in FIG. 7, is provided with an aperture 32 through which transmission lines 11 and 12 can communicate. Aperture 31 has a length substantially equal to one-quarter of the center of the operating frequency band and has a width so that when transmission lines 11 and 12 are laterally displaced to their second position, the portion of transmission line 11 coextensive with the length of aperture 32 faces surface 17 through aperture 32 and the portion of transmission line 12 coextensive with the length of aperture 32 faces surface 17 through aperture 32. In other words, the width of aperture 32 is equal to the distance between side wall 33 of transmission line 11 and side wall 34 of transmission line 12 when transmission lines 11 and 12 are in their second position of lateral displacement. This distance is substantially equal to twice the width of each transmission line.

Common wall 31 is immovably placed on upper surface 14 of base plate 13 so that aperture side wall 35 is lined up with the inner edge of side wall 33 and aperture side wall 36 is to the right of transmission line 11 as seen facing FIG. 1. When transmission lines 11 and 12 are laterally displaced to their second position, side wall 36 of aperture 32 is lined up with the inner edge of side wall 34 of transmission line 12. The portion of transmission lines 11 and 12 lying between aperture walls 37 and 38 is also referred to as the apertured portion since it is the region in which transfer of wave energy takes place between transmission lines 11 and 12. Also, even though the outer conductors of both transmission lines are generally grounded, reference to the term ground plane is usually made in connection with surfaces 14 and 17 in the apertured region since this region is of particular significance in the operation of this invention because transmission line 11 faces surface 17 through aperture 32 and transmission line 12 faces surface 14 through aperture 32 during lateral displacement from their first position.

In the drawing, common wall 31 is shown much thicker than it actually is for reasons of greater clarity so that the drawing is not to scale.

As is best seen in FIG. 2, the portions of inner conductor strips 25 and 26, coextensive with aperture 32 and respectively designated by reference characters 39 and 40, are spaced much closer to one another than the portions of strips 25 and 26 outside aperture 32. In fact, the strip spacing in the apertured section is as small as is compatible with proper strip support, proper impedance restoration as explained hereinafter, and proper mode suppression. To provide closer spacing, strip portion 39 is formed by providing a double bend in strip 25 at each end of strip portion 39 so that strip portion 39 is an upward displaced parallel continuation of strip 25. Strip portion 40 is similarly formed and comprises a downward displacement. As best seen in FIG. 3, portions 39 and 40 are spaced much closer to one another than strips 25 and 26 as seen in FIG. 1, the former being a section through the apertured portion.

Means for properly and conveniently supporting strip portions 39 and 40 are best seen in FIG. 3. Insert 27 continues straight through the apertured section and is not changed. However, a new closure insert 41 is provided which is similar to closure insert 30 except that it is provided with a deeper channel for accommodating strip portions 39 and 40. A spacer member 42, made of a low-loss dielectric such as Teflon, is utilized to fill the gap between the surfaces of insert 27 and the adjacent strip portions 39 and 40.

It has been found that respectively raising and lowering strip portions 39 and 40, by, say .035 inch to provide a total strip portion separation of .030 inch, results in sufficient close coupling making possible an insertion loss of less than 4 db. Closer spacing of the strip portion will further decrease the insertion loss (and increase in coupling) should this be found desirable.

It is to be noted that the lines can also be brought close together electrically for minimum insertion loss coupling without physically displacing the lines. This may be accomplished by inserting a dielectric, having very high dielectric constant, in the apertured section in place of strip 41.

FIG. 2 further shows diagrammatically how attenuator device 10 of this invention may be connected between a wave energy source generator 45 and a utilization device 46. Generator 45 is connected to apply its output signal to the left side of transmission line 11 while utilization device 46 is connected to receive the coupled signal from the left side of transmission line 12. The portion of wave energy from generator 45 not coupled from transmission line 11 to transmission line 12 through the apertured portion continues to be propagated along transmission line 11 for absorption in a dummy load 47. Dummy load 47 is a termination device selected to substantially absorb a wave travelling towards it and to develop practically no reflections. However, since no dummy load is a perfect termination, a certain amount of reflections are generated. A portion of these reflections are coupled into transmission line 12 for propagation to the right. Consequently, a further dummy load 48 is connected to absorb these reflections so that utilization device 46 receives only wave energy coupled to transmission line 12 by energy flowing to the right in transmission line 11.

Figure 4:
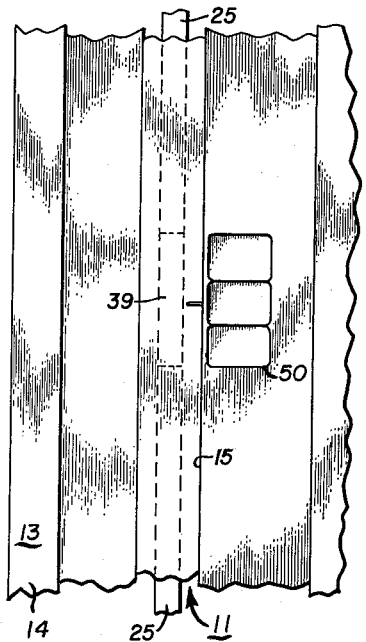
FIG. 4 is an elevational view taken along line 4—4 of FIG. 1 looking down upon the lower waveguide translation path.
Figure 6:
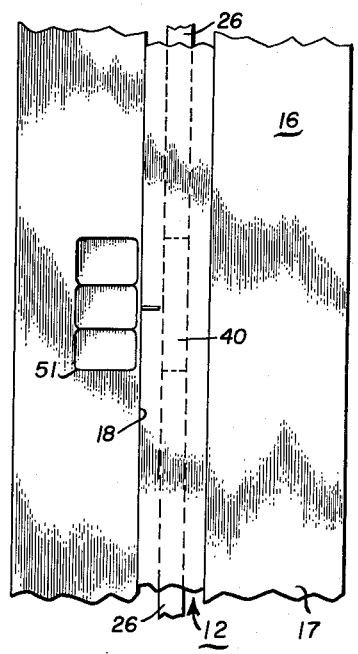
FIG. 6 is an elevational view taken along line 6—6 of FIG. 1 looking up at the upper waveguide translation path.
Figure 5:
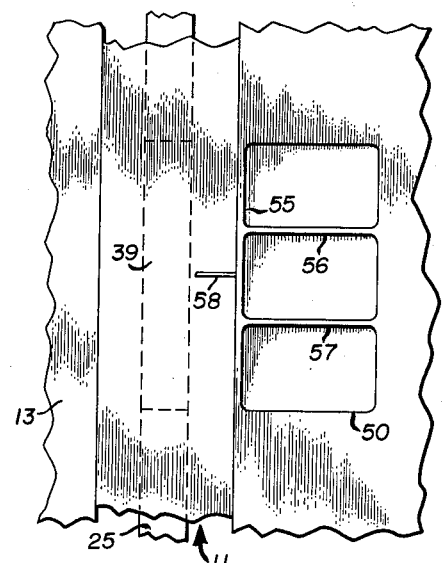
FIG. 5 is an enlarged view of the center portion of FIG. 4 showing the details of the cavity and mode suppressor.

Referring now to FIGS. 4 and 6, there are shown respectively a top view of base plate 13 and a bottom view of upper plate 16. Each of plates 13 and 16 is provided with a cavity 50 and 51 respectively having end walls coextensive with edges 37 and 38 of aperture 32. In other words, the length and position of cavities 50 and 51 are the same as and coextensive with aperture 32. The width of each cavity is substantially equal to the width of the transmission lines. Cavity 50 in surface 14 is immediately adjacent channel 15 and to the right thereof as viewed in FIG. 3. Similarly, cavity 51 in surface 17 is immediately adjacent channel 18 and to the left thereof. An enlarged view of cavity 50 is shown in FIG. 5 and is dimensioned such that when transmission lines 11 and 12 are laterally displaced to their second position, each transmission line looks into a cavity contained in the opposite plate through aperture 32. In other words, as transmission lines 11 and 12 are laterally displaced towards their maximum distance of separation, the portion of each transmission line coextensive with aperture 32 faces a cavity which provides a remote ground plane in the apertured section.

The depth of cavities 50 and 51 is selected so that the line to ground plane distance is correct to restore the characteristic impedance of the apertured region of the transmission lines, which was changed by displacing strips 25 and 26, to the characteristic impedance of the transmission lines outside the apertured region. In other words, the ground plane in the region of strip portions 39 and 40 is moved to a greater amount of separation from strip portions 39 and 40 to compensate for the changed position of strip portions 39 and 40 and further to compensate for the fact that this increased distance is filled with air and not the low-loss dielectric material of the inserts.

It has been found that for a 50 ohm characteristic impedance, with an attenuator dimensioned as described hereinbefore, substantial impedance restoration is obtained by providing a cavity having a depth substantially equal to .017 inch so that the distance between a strip portion and its cavitated ground plane becomes substantially equal to .032 inch. These values of the cavity depth may be calculated by taking into account that the space between the raised strip portion and the bottom of the cavity includes both a solid dielectric and air or may be empirically determined.

In order to provide mode suppression in the apertured portion of attenuator 10, it has been found desirable to provide a thin wall 55 (FIG. 5) between transmission line 11 and cavity 50 and to erect a plurality of ridges such as 56 and 57 across cavity 50. Of course, wall 55 also operates to tightly close apertured portion when lines 11 and 12 are in their second position. The number of ridges to be placed need not be two as shown, but may include more or less, depending on the modes to be suppressed and the geometry of the apertured section. Ridges such as 56 and 57 are selected to be thin since they otherwise may operate as a ground plane and nullify the impedance restoration provided by the bottom surface of the cavity. In other words, the widths of ridges, such as 56 and 57, are selected so that they do not affect the impedance of the apertured portion of the transmission lines but suppress higher order modes. Ridges 56 and 57 have been found to provide excellent mode suppression.

While ridges such as 56 and 57 in the cavities provide excellent mode suppression, particularly when transmission lines 11 and 12 are in their second position for maximum attenuation, it has been found that in lateral positions between minimum and maximum attenuation, each transmission line in the apertured portion faces both, a portion of the opposite transmission line and a portion of the cavitated ground plane. To prevent the generation of higher order modes when the attenuator is in these intermediate positions, it has been found desirable, in certain instances, to provide a further mode suppressor in the form of one or more conductive members 58 conductively connected to the ground plane (such as wall 55 of FIG. 5) and extending, in a direction perpendicular to the direction of wave propagation, towards strip portion 39. Conductive member 58 may be of a length so that it extends a substantial distance towards but does not touch strip portion 39 so as not to ground it. Also, the height of conductive member 58 may be such that it corresponds to the height of insert 41 so that it may conveniently be embedded in and supported by insert 41.

Figure 8A:
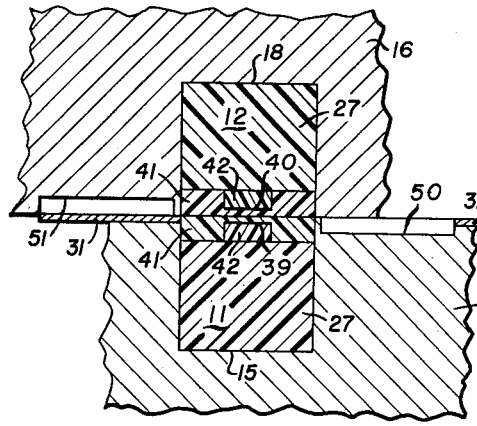
FIGS. 8a, 8b, 8c and 8d are enlarged sectional views, similar to the view of FIG. 3, showing four different positions of the continuously variable attenuator of this invention.

Referring now to FIGS. 8a, 8b, 8c and 8d, there are shown enlarged sectional views, such as views taken along lines 3—3 of FIG. 2, of four different positions of lateral displacement of transmission lines 11 and 12. Each view is a section through the apertured regions of the transmission lines starting with the first position, then two intermediate positions and ending with the second position. FIG. 8a shows the position of maximum coupling in which transmission lines 11 and 12 are opposite and coextensive to one another across aperture 32. It has been found that by closely spacing strip portions 39 and 40 to one another, the insertion loss may be kept to below 3 db so that more than one-half of the energy from generator 45 may be transmitted to utilization device 46.

Figure 8B:
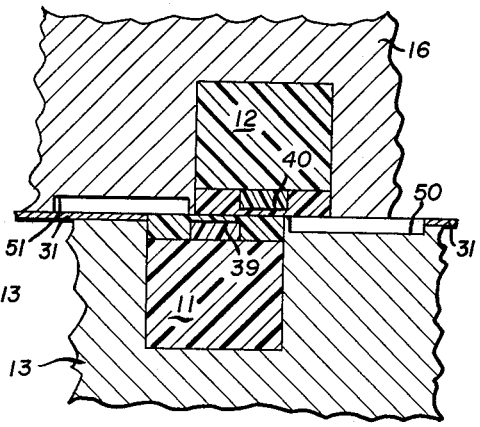
Figure 8C:
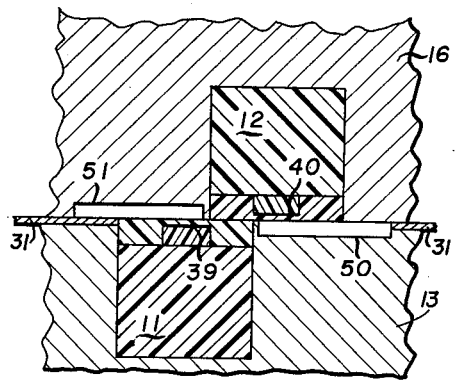
Figure 8D:
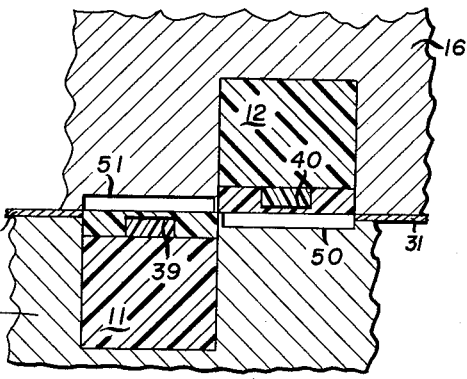

FIG. 8b shows transmission lines 11 and 12 displaced by one-third of the maximum lateral displacement. It is immediately noticed that transmission line 11 sees not only two-thirds of transmission line 12 but also one-third of cavity 51 in upper plate 16. The same is, of course, true of transmission line 12 which sees one-third of cavity 50 in base plate 13. FIG. 8c shows transmission lines 11 and 12 displaced two-thirds of their maximum lateral displacement distance so that each transmission line sees one-third of the opposite transmission line and two-thirds of the cavity adjacent the opposite transmission line. Since strip portions 39 and 40 are substantially displaced from one another the degree of coupling in this position is already very small. FIG. 8d shows transmission lines 11 and 12 displaced their maximum distance (second portion) so that transmission line 11 only sees cavity 51 as its ground plane through aperture 32 and transmission line 12 only sees cavity 50 as its ground plane. This, of course, is the position of minimum coupling, providing an attenuation above 80 db.

There has been described hereinabove a continuously variable attenuator having properties of a directional coupler and being capable of providing attenuation from below 3 db to above 80 db between a pair of transmission lines. The attenuator is substantially reflectionless which is due, in part, to its utilization of cavitated ground planes to restore the impedance of the apertured line portion in which strip spacing is closer than throughout the remainder of the transmission lines so that a small insertion loss is realized. The attenuator device of this invention is also provided with mode suppressor means so that no higher modes are generated.

What is claimed is:

1. A continuously variable attenuator comprising: a first wave energy transmission line portion; a second wave energy transmission line portion extending substantially parallel to said first transmission line portion, said first and said second transmission line portions being mounted for continuously variable relative lateral motion between a first position in which said transmission line portions are substantially coextensive to a second position in which said transmission line portions are substantially displaced; aperture means between said first and second transmission line portions for coupling said transmission line portions to one another, the degree of coupling across said aperture means being proportional to the relative lateral displacement between said transmission line portions and being variable from a maximum at said first position to a minimum at said second position, said aperture means having a length approximately equal to one-quarter of the mean operating wavelength of the transmitted wave energy; and impedance restoring means coextensive with the length of said aperture means carried by each of said transmission line portions to maintain the impedance of said transmission line portions at a preselected value when said transmission line portions are laterally displaced from said first position, the impedance restoring means carried by said first transmission line portion cooperating with said second transmission line portion and the impedance restoring means carried in said second transmission line portion cooperating with said first transmission line portion.

2. A continuously variable attenuator comprising: a first wave energy transmission line portion having an inner conductor; a second wave energy transmission line portion having an inner conductor extending substantially parallel to said first transmission line portion, said first and said second transmission line portions being mounted for continuously variable relative lateral motion between a first position in which said transmission line portions are substantially coextensive to a second position in which said transmission line portions are substantially displaced; aperture means between said first and second transmission line portions for coupling said transmission line portions to one another, the inner conductors coextensive with the length of said aperture means being in closer electrical proximity than outside the length of said aperture means, the degree of coupling across said aperture means being proportional to the relative lateral displacement between said transmission line portions and being variable from a maximum at said first position to a minimum at said second position, said aperture means having a length approximately equal to one-quarter of the mean operating wavelength of the transmitted wave energy; impedance restoring means coextensive with the length of said aperture means carried by each of said transmission line portions to maintain the impedance of said transmission line portions at a preselected value when said transmission line portions are laterally displaced from said first position, the impedance restoring means carried by said first transmission line portion cooperating with said second transmission line portion and the impedance restoring means carried by said second transmission line portion cooperating with said first transmission line portion; and mode suppression means associated with each said impedance restoring means to prevent the generation of higher order modes when said transmission line portions are laterally displaced from said first position.

3. A continuously variable attenuator comprising: a first wave energy transmission line portion including an inner conductor; a second wave energy transmission line portion including an inner conductor extending substantially parallel to said first transmission line portion, said first and said second transmission line portions being mounted for continuously variable relative lateral motion between a first position in which said transmission line portions are substantially coextensive to a second position in which said transmission line portions are substantially displaced; aperture means between said first and second transmission line portions, the inner conductors coextensive with the length of said aperture means being placed in close electrical proximity for maximum coupling between said transmission line portions, the degree of coupling across said aperture means being proportional to the relative lateral displacement between said transmission line portions and being variable from a maximum at said first position to a minimum at said second position, said aperture means having a length approximately equal to one-quarter of the mean operating wavelength of the transmitted wave energy; impedance restoring means coextensive with the length of said aperture means carried by each of said transmission line portions to maintain the impedance of said transmission line portions at a preselected value when said transmission line portions are laterally displaced from said first position, the impedance restoring means carried by said first transmission line portion cooperating with said second transmission line portion and the impedance restoring means carried by said second transmission line portion cooperating with said first transmission line portion; mode suppression means associated with each said impedance restoring means to suppress the generation of higher order modes when said transmission line portions are laterally displaced from said first position; and further mode suppression means associated with each transmission line portion section coextensive with the length of said aperture means to suppress the generation of higher modes when said transmission line portions are laterally displaced from their said first position.

4. A continuously variable attenuator in accordance with claim 3 in which said transmission line portions are strip lines having an outer conductor of substantially rectangular cross section and an inner conductor in the form of a thin strip.

5. A continuously variable attenuator in accordance with claim 4 in which said aperture means comprises a thin substantially planar foil member forming a common wall between said strip lines and including a rectangular aperture having a width which extends from a side wall of said first strip line a distance equal to the combined width of said strip lines when in said second position.

6. A continuously variable attenuator in accordance with claim 5 in which said impedance restoring means comprises a cavitated ground plane, the width of the cavity being substantially equal to the width of the strip line cooperating with the cavity and the depth of the cavity being selected to provide an inner conductor to ground plane separation compensating for the increased electrical proximity of the inner conductors.

7. A continuously variable attenuator in accordance with claim 6 in which said mode suppression means is in the form of a plurality of ridges extending across the impedance restoring cavity in a direction transverse to the direction of wave propagation and in which said further mode suppression means is in the form of a conductive foil member extending from a side wall of said transmission line portions in the direction of the inner conductor.

8. A continuously variable attenuator comprising: a first wave energy strip transmission line portion open along one side; a second wave energy strip transmission line portion open along one side; a thin substantially planar foil member, the open side of said first and second transmission line portions being disposed parallel to one another and immediately adjacent on opposite sides of said foil member, said transmission line portions being laterally movable between a first position in which said open sides are coextensive and a second position in which said open sides have no coextensive portion, said foil member including a substantially rectangular aperture for communicating said first and said second transmission line portions, said aperture having a length approximately equal to one-quarter of the mean operating wavelength of the transmitted wave energy and a width approximately equal to and coextensive with the combined widths of the open side of said transmission line portions when in said second position, the strip sections formed by the inner conductors of said strip transmission line portions coextensive with the length of said aperture being spaced for maximum electrical coupling; means between said transmission line portions for continuously varying lateral displacement between said first and said second positions; and impedance restoring means carried by each of said transmission line portions and extending coextensively with the length of said aperture and cooperating with the opposite transmission line portion to compensate for the impedance mismatch caused by the increased electrical proximity of said strip section when said transmission line portions are laterally displaced from said first position.

9. A continuously variable attenuator comprising: a first wave energy strip transmission line portion open along one side; a second wave energy strip transmission line portion open along one side; a thin substantially planar foil member, the open side of said first and second transmission portions being disposed parallel to one another and immediately adjacent on opposite sides of said foil member, said transmission line portions being laterally movable with respect to one another between a first position in which said open sides are coextensive and a second position in which said open sides have no coextensive portion, said foil member including a substantially rectangular aperture for defining an apertured section for communicating said first and said second transmission line portions, said aperture having a length approximately equal to one-quarter of the mean operating wavelength of the transmitted wave energy and a width approximately equal to and coextensive with the combined widths of the open sides of said transmission line portions when in said second position, the strip sections in the apertured section being displaced towards one another for increased electric coupling; a laterally disposed cavitated ground plane carried by each of said transmission line portions for cooperation with the apertured section of the opposite transmission line portion, the depth of the cavity in each ground plane being selected to compensate for the impedance mismatch caused by the displacement of said strip sections for increased electrical coupling when said transmission line portions are laterally displaced from said first position; and means associated with the apertured section of said transmission lines to prevent the generation of higher order modes.

10. A continuously variable attenuator comprising: a first wave energy strip transmission line portion open along one side; a second wave energy strip transmission line portion open along one side; a thin substantially planar foil member, the open side of said first and second transmission portions being disposed parallel to one another and immediately adjacent on opposite sides of said foil member, said foil member being fixed with respect to one of said transmission line portions and the other transmission line portion being laterally movable thereacross between a first position in which said open sides are coextensive and a second position in which said open sides have no coextensive portion, said foil member including a substantially rectangular aperture for communicating said first and said second transmission line portions, said aperture having a length approximately equal to one-quarter of the mean operating wavelength of the transmitted wave energy and a width approximately equal to and coextensive with the combined widths of the open sides of said transmission line portions when in said second position, the strip sections forming the inner conductors of said strip transmission line portions coextensive with the length of said aperture being in substantially closer electric proximity than along the remainder of said transmission line portions; impedance restoring means carried by each of said transmission line portions and extending coextensively with the length of said aperture and cooperating with the opposite transmission line portion to compensate for the impedance mismatch caused by the increased electrical proximity of said strip sections when said transmission line portions are laterally displaced from said first position; and mode suppressor means associated with each impedance restoring means to suppress the generation of higher order modes when said transmission line portions are laterally displaced from said first position; and further mode suppressor means in each transmission line portion and within the length of said aperture to suppress the generation of higher order modes when said transmission line portions are laterally displaced from said first position.

11. A continuously variable attenuator comprising: a first wave energy strip transmission line having an open top wall; a thin planar common wall overlying said open top wall; a second wave energy strip transmission line substantially parallel to said first transmission line and having an open bottom wall and mounted for lateral motion over said common wall opposite to said first transmission line; hand operated displacement means coupled between said first and said second transmission lines for laterally and continuously moving said second transmission line between a first position in which said open bottom wall substantially overlies said open top wall and a second position in which said open bottom wall is laterally displaced to be adjacent said open bottom wall; a substantially rectangular aperture in said common wall having a length approximately equal to one-quarter of the mean operating wavelength of the wave energy to be transmitted and a width approximately equal to and extending across the combined width of said open walls when said transmission lines are in their second position, the inner conductor strip portions in said transmission lines coextensive with the length of said aperture being in closer electrical proximity than along the remainder of said transmission lines; and a pair of ground plane extension means substantially parallel to said common wall depending sideways from one side wall of each transmission line in opposite direction, said pair of extension means being coextensive with said aperture when said transmission lines are in said second position and each extension means covering the aperture exposed open wall portion of the opposite transmission line to restore the impedance of the aperture exposed, non-coextensive transmission line portions to the impedance of the remainder of said transmission lines.

12. A continuously variable attenuator comprising: a first wave energy strip transmission line having an open top wall; a thin planar common wall overlying said open top wall; a second wave energy strip transmission line substantially parallel to said first transmission line and having an open bottom wall and mounted for lateral motion over said common wall opposite to said first transmission line; hand actuated displacement means coupled between said first and said second transmission lines for laterally and continuously moving said second transmission line between a first position in which said open bottom wall substantially overlies said open top wall and a second position in which said open bottom wall is laterally displaced to be adjacent said open bottom wall; a substantially rectangular aperture in said common wall having a length approximately equal to one-quarter of the mean operating wavelength of the wave energy to be transmitted and a width approximately equal to and extending across the combined width of said open walls when said transmission lines are in their second position, the inner conductor strip portions in said transmission lines coextensive with the length of said aperture being in closer electrical proximity than along the remainder of said transmission lines; a pair of ground plane extension means substantially parallel to said common wall depending sideways from one side wall of each transmission line in opposite direction, said pair of extension means being coextensive with said aperture when said transmission lines are in said second position and each extension means covering the aperture exposed open wall portion of the opposite transmission line to restore the impedance of the aperture exposed, non-coextensive transmission line portions to the impedance of the remainder of said transmission lines; mode suppression means associated with each extension means to suppress the generation of higher order modes; and further mode suppression means associated with the portion of each transmission line coextensive with said aperture.

13. A continuously variable attenuator comprising: a first wave energy strip transmission line formed of an open channel in a platelike conductive first member and having an inner conductor supported in its channel by a low loss dielectric; a thin planar conductive common wall overlying the open channel of said first member; a second wave energy strip transmission line likewise formed of an open channel in a platelike conductive second member having an inner conductor supported in its channel by a low loss dielectric, said second transmission line overlying said common wall with its channels facing said common wall, said channels being substantially parallel to one another and said second member being mounted for lateral motion over said common wall; displacement means coupled between said first and said second transmission lines for laterally and continuously moving said second transmission line between a first position in which the channel of said second member substantially overlies the open channel of said first member and a second position in which said open channels are laterally displaced to be adjacent; a substantially rectangular aperture in said common wall having a length approximately equal to one-quarter of the mean operating wavelength of the wave energy to be transmitted and a width approximately equal to and extending across the combined width of said open channels when said transmission lines are in their second position, the inner conductor portions in said transmission lines coextensive with the length of said aperture being positioned in closer electrical proximity than along the remainder of said transmission lines; and a cavity adjacent said channels in said first and second members and on opposite sides thereof facing the opposite channel through said aperture when said transmission lines are in said second position, the length of said cavities being substantially equal to the length of said aperture and the width of each cavity being substantially equal to the width of the channel it faces in said second position, the depth of each cavity being selected so that the separation between the bottom of the cavity and the inner conductor portion it faces effectively restores the impedance of the transmission line section coextensive with said aperture to the impedance of the transmission line section outside said aperture.

14. A continuously variable attenuator in accordance with claim 13 in which each cavity includes a plurality of thin ridges across its width for mode suppression.

15. A continuously variable attenuator in accordance with claim 14 in which each transmission line includes a mode suppression means in the section coextensive with said aperture.

References Cited in the file of this patent

UNITED STATES PATENTS 3,095,544     Ayer et al. _____ June 25, 1963